United States Patent
Bifano et al.

(10) Patent No.: US 11,433,724 B2
(45) Date of Patent: Sep. 6, 2022

(54) WHEEL SUSPENSION AND SWING ARM FOR A WHEEL DRIVEN BY AN ELECTRICAL OR PNEUMATIC MOTOR

(71) Applicant: ZIEHL-ABEGG AUTOMOTIVE GMBH & CO. KG, Kupferzell (DE)

(72) Inventors: Natale Cosmo Bifano, Frankfurt (DE); Dzmitry Siamenau, Schwäbisch Hall (DE)

(73) Assignee: ZIEHL-ABEGG AUTOMOTIVE GMBH & CO. KG, Kupferzell (DE)

( * ) Notice: Subject to any disclaimer, the term of this patent is extended or adjusted under 35 U.S.C. 154(b) by 0 days.

(21) Appl. No.: 17/275,786

(22) PCT Filed: Jul. 31, 2019

(86) PCT No.: PCT/DE2019/200092
§ 371 (c)(1),
(2) Date: Mar. 12, 2021

(87) PCT Pub. No.: WO2020/052716
PCT Pub. Date: Mar. 19, 2020

(65) Prior Publication Data
US 2022/0048347 A1    Feb. 17, 2022

(30) Foreign Application Priority Data

Sep. 12, 2018 (DE) .................. 102018215530.5
Oct. 10, 2018 (DE) .................. 102018217345.1

(51) Int. Cl.
*B60G 3/14*    (2006.01)
*B60G 7/00*    (2006.01)
*B60K 7/00*    (2006.01)

(52) U.S. Cl.
CPC ............. *B60G 3/145* (2013.01); *B60G 7/001* (2013.01); *B60K 7/0007* (2013.01);
(Continued)

(58) Field of Classification Search
CPC .............................. B60G 3/145; B60G 7/001; B60G 2200/1322; B60G 2200/422;
(Continued)

(56) References Cited

U.S. PATENT DOCUMENTS

2003/0230443 A1* 12/2003 Cramer ................ B62D 21/152
180/65.51
2004/0251651 A1* 12/2004 Yamamoto .......... B60G 17/021
280/124.128
(Continued)

FOREIGN PATENT DOCUMENTS

DE       10249445 A1 *  1/2004 ............. B60G 3/145
DE   102008054670 A1 *  6/2010 ........... B60G 21/055
(Continued)

*Primary Examiner* — James A English
*Assistant Examiner* — Scott F. Underwood
(74) *Attorney, Agent, or Firm* — Jason P. Mueller; FisherBroyles, LLP

(57) ABSTRACT

A wheel suspension (1) for a wheel (23) of a vehicle, in particular the rear wheel of a utility vehicle, driven by an electric or pneumatic motor (2), having a swing arm (3) which is mounted pivotably around a pivot axis (7) on the vehicle in a first region (4) and is supported on the vehicle in a second region (8), wherein a third region (10) of the swing arm (3) carries a part of the motor (2) which is rotationally fixed in relation to the swing arm (3) in order to transmit a torque to the wheel using a rotating part of the motor (2).

14 Claims, 5 Drawing Sheets

Figure 2B:
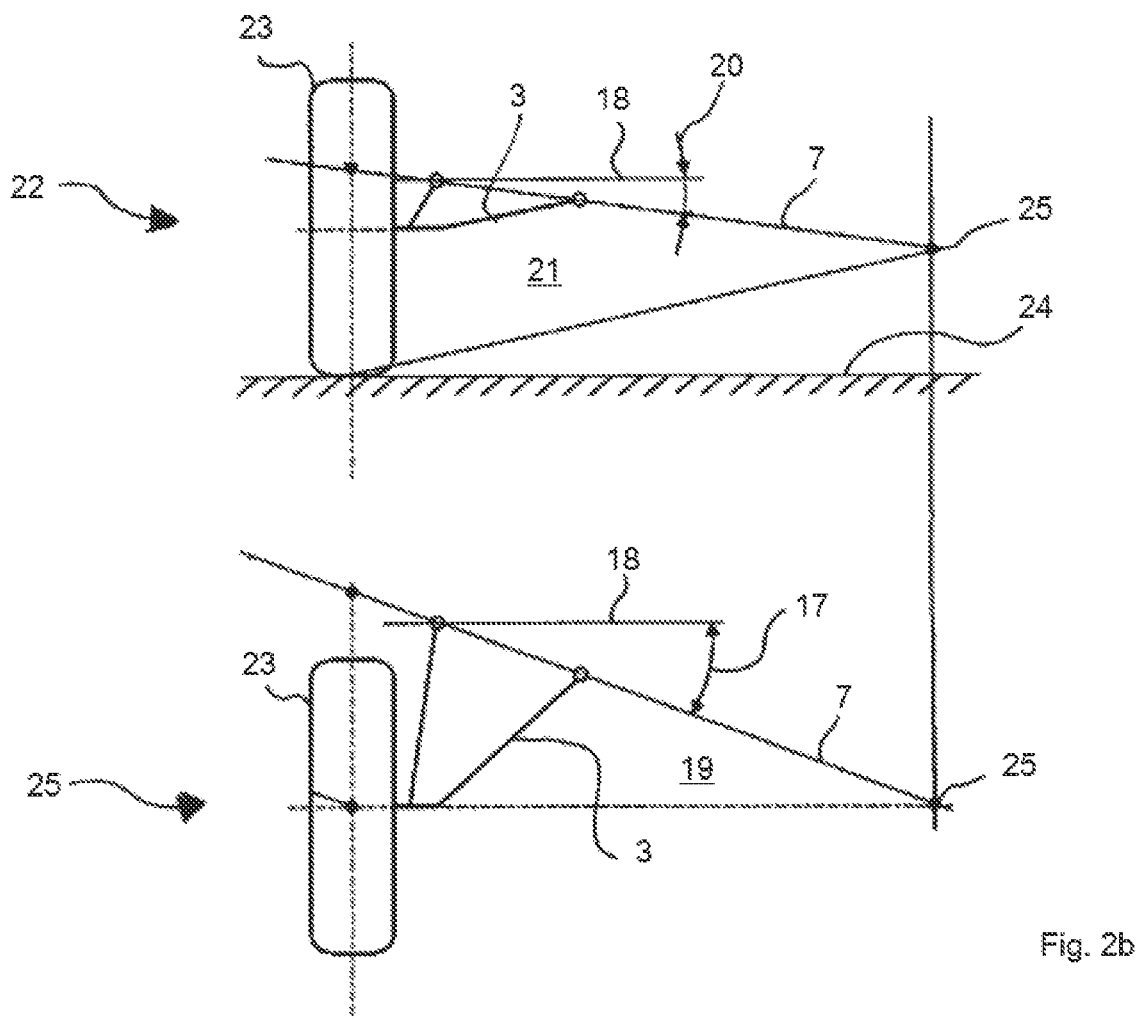

(52) U.S. Cl.
CPC .... *B60K 7/0023* (2013.01); *B60G 2200/1322* (2013.01); *B60G 2204/129* (2013.01); *B60G 2204/182* (2013.01); *B60G 2206/011* (2013.01); *B60G 2206/012* (2013.01); *B60G 2206/12* (2013.01); *B60G 2206/124* (2013.01); *B60G 2300/14* (2013.01)

(58) Field of Classification Search
CPC ........ B60G 2204/129; B60G 2204/182; B60G 2204/18; B60G 2204/202; B60G 2206/011; B60G 2206/012; B60G 2206/12; B60G 2206/124; B60G 2206/911; B60G 2300/14; B60G 2300/50; B60K 7/0007; B60K 7/00; B60K 7/0023; B60K 11/00; F16D 2055/0008
See application file for complete search history.

(56) References Cited

U.S. PATENT DOCUMENTS

| | | | | |
|---|---|---|---|---|
| 2006/0076197 | A1* | 4/2006 | Ishida | F16D 55/226 188/26 |
| 2008/0053725 | A1* | 3/2008 | Kramer | B60K 7/0007 280/124.128 |
| 2009/0058030 | A1* | 3/2009 | Fujita | B62K 25/283 280/124.128 |
| 2010/0163323 | A1* | 7/2010 | Pickholz | B60L 15/00 310/67 R |
| 2012/0000724 | A1* | 1/2012 | Mimura | B62M 7/12 180/291 |
| 2012/0181097 | A1* | 7/2012 | Hatanaka | B62K 11/10 180/65.31 |
| 2016/0089944 | A1* | 3/2016 | Kuwabara | B60G 7/001 280/124.134 |
| 2016/0368340 | A1* | 12/2016 | Nolin | B62K 5/027 |

FOREIGN PATENT DOCUMENTS

| | | | | |
|---|---|---|---|---|
| DE | 102010041370 | A1 * | 3/2012 | ............. B60G 3/145 |
| DE | 102011005617 | A1 * | 9/2012 | ........... B60K 7/0007 |
| DE | 102013000541 | A1 * | 7/2013 | ............... B60G 3/00 |
| DE | 102013214737 | A1 * | 1/2015 | ............. B60G 11/27 |
| DE | 102015213354 | A1 * | 1/2017 | ........... B60G 21/051 |
| DE | 102015213356 | A1 * | 1/2017 | ........... B60G 21/051 |
| DE | 102016223374 | A1 * | 5/2018 | |
| DE | 202017001665 | U1 * | 8/2018 | ............. B60G 3/145 |
| GB | 2498436 | A * | 7/2013 | ............. B60G 3/145 |
| RU | 2509657 | C2 | 3/2014 | |
| WO | WO-2007052139 | A1 * | 5/2007 | ............. B60G 3/145 |
| WO | WO-2008020861 | A1 * | 2/2008 | ......... B60B 35/1036 |
| WO | WO-2015087659 | A1 * | 6/2015 | ............. B60G 11/16 |
| WO | WO-2017098492 | A1 * | 6/2017 | ........... B60G 21/051 |

* cited by examiner

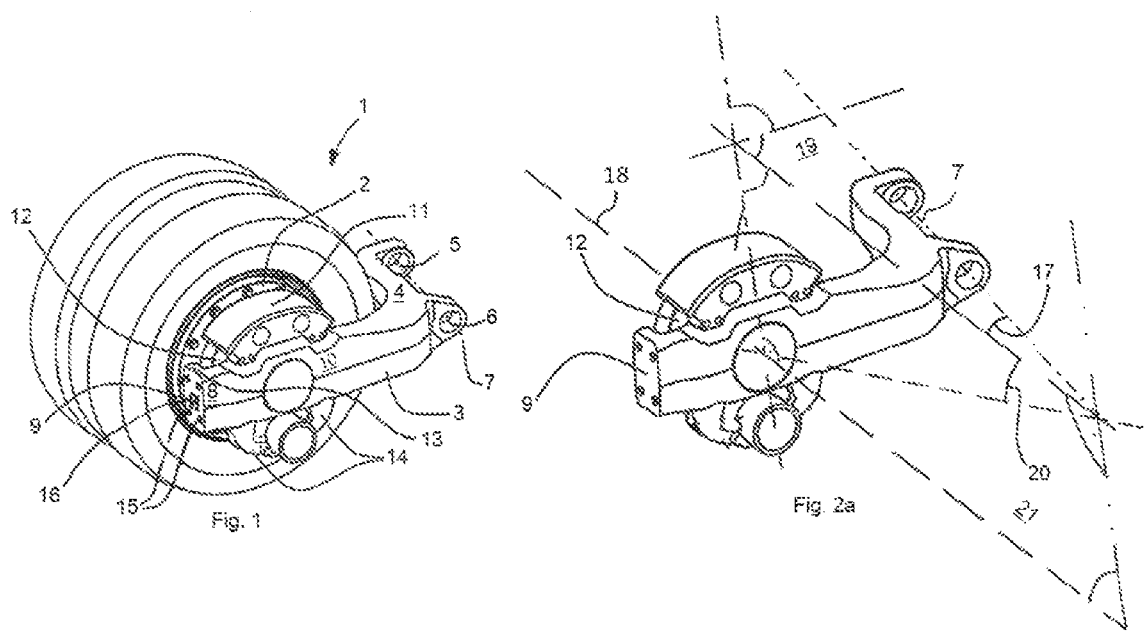

WHEEL SUSPENSION AND SWING ARM FOR A WHEEL DRIVEN BY AN ELECTRICAL OR PNEUMATIC MOTOR

This application is a 35 U.S.C. § 371 national stage claiming priority based on International Application PCT/DE 2019/200092, filed Jul. 31, 2019, which in turn claims priority based on DE 2018 215 530.5, filed Sep. 12, 2018 and DE 2018 217 345.1, filed Oct. 10, 2018, the disclosures of which are incorporated herein by reference.

The disclosure relates to a wheel suspension for a wheel of a vehicle driven by an electric or pneumatic motor, in particular the rear wheel of a utility vehicle.

Wheel suspensions of the type in question have been known in practice for years. Single-link suspensions are common for rear axles in particular, for example trailing arm or semi-trailing arm suspensions. In these suspensions, the wheel is pivotably mounted on the vehicle via only one so-called link—the swing arm. In these single-link suspensions, longitudinal and transverse forces occurring during operation can be absorbed most effectively when the swing arm is arranged diagonally (semi-trailing arm suspension) and has two bearing points at a large distance from one another on the body side. A pivot axis of the swing arm can extend obliquely to a vehicle transverse axis in a horizontal plane (sweep angle) and can extend obliquely to the vehicle transverse axis in a horizontal plane (roof angle). By manipulating the sweep angle and/or the roof angle, for example, the roll center, the track width change, the brake pitch support, and the camber change can be deliberately manipulated.

This manipulability is limited by the fact that the left and right wheels of an axle in wheel suspensions according to the prior art are coupled to one another by the drive train—generally via a differential gear. The vehicle behavior may only be controlled to a limited extent by interactions between the wheels.

The known single-link suspensions and in particular semi-trailing arm suspensions are usually provided with complex mounts for elements of the drive train, in particular to transmit torque from an engine of the vehicle via a drive train to the respective wheel. This conventional type of wheel suspension requires a comparatively large installation space, which is then no longer usable for other components of the vehicle. In addition, the interaction between the drive train or its shafts and the wheel suspensions is complicated, sensitive, and difficult to control.

The present disclosure is therefore based on the object of simplifying a wheel suspension of the type mentioned at the outset and of designing it in a space-saving manner and refining it to be more robust.

The above object is achieved according to the disclosure by the following features. A wheel suspension for a wheel of a vehicle driven by an electric or pneumatic motor is specified. The driven wheel is in particular the rear wheel of a utility vehicle. These can be, for example, low-floor vehicles such as city buses and airport buses, double-decker buses, or other utility vehicles.

The wheel suspension comprises a swing arm, which is mounted pivotably on the vehicle around a pivot axis in a first region, and is supported on the vehicle in a second region, wherein a third region of the swing arm carries a part of the motor which is rotationally fixed in relation to the swing arm in order to transmit a torque to the wheel using a rotating part of the motor.

In the manner according to the disclosure it has been recognized that the underlying object can be achieved in a surprisingly simple manner in that the stationary part of the motor is seated on the swing arm. The motor thus only drives one wheel of the vehicle. Instead of a complicated mounting of a drive shaft in the swing arm, the motor is connected directly to the swing arm. This solution is space-saving, because a drive train is completely eliminated, so that much more installation space is available in the floor area of the vehicle for other purposes or components, for example to house batteries in the vehicle underbody. Thus, on the one hand, the power supply to the motor is secured via short supply lines, and on the other hand, the center of gravity of the entire vehicle is shifted downwards. Due to a low shear point, electrically or pneumatically operated utility vehicles may also be produced in lightweight construction and may be designed to be even more energy-efficient.

The motor can be seated on the side of the swing arm that is oriented toward the vehicle center and can drive the wheel by means of a shaft that extends through the swing arm. This can in particular be an internal rotor motor, which is preferably permanently excited. The part on the outside is then seated on the swing arm as a stationary part of the motor.

The motor is preferably designed as a wheel hub drive. This can be a gearless permanent magnet synchronous motor (PMSM) having an external rotor, however the use of other drive concepts having countershaft gears or planetary gears is also conceivable.

This design of the motor as a wheel hub drive is particularly space-saving, since both the stationary and the rotating parts of the motor and the wheel are seated on the outside or on the wheel side on the swing arm, so that the entire wheel suspension is embodied to be even more space-saving. If the wheel suspension is used in city buses or airport buses, this not only enables an even lower and even more passenger-friendly low-floor design. Rather, by eliminating the countershaft gear, a larger passage width between two wheel suspensions of an axle, for example the rear axle, may be implemented. The vehicle would thus be usable over its entire length for, for example, strollers or wheelchairs.

Furthermore, vehicles already in operation that are provided with conventional drive trains and a single-link suspension may be refitted easily and inexpensively to an electric drive or a pneumatic drive using a wheel suspension according to the disclosure. The batteries required for this may then, for example, be housed in the vehicle underbody instead of the drive train, or where the internal combustion engine was previously located and, depending on the type of utility vehicle, dimensioned according to requirements in order to be able to ensure a required range of the utility vehicle.

By eliminating the elements of the drive train, the wheel-sprung masses may be reduced despite the electric or pneumatic motor. The wheels retract completely independently of one another due to the respective wheel suspension and may be controlled and moved completely independently of one another by the respective motor, so that the vibration behavior of the vehicle can be improved.

The swing arm can in particular be a trailing arm swing arm for a trailing arm wheel suspension. In an advantageous refinement, however, the swing arm can also be a semi-trailing arm swing arm for a semi-trailing arm wheel suspension. By way of appropriate dimensioning, semi-trailing arm wheel suspensions are capable of absorbing the longitudinal and transverse forces occurring when driving in a particularly advantageous manner and of improving the chassis kinematics.

The swing arm preferably has a sweep angle that lies in a first angle range between 10° and 25° and has a roof angle that lies in a second range between 0° and 5°. In these angle ranges, the use of semi-trailing arm suspensions leads to particularly low tire wear and advantageous roll behavior.

More preferably, the first region of the swing arm can be designed as a hollow body. Thus, the semi-trailing arm may be produced using casting technology. However, it is also possible to produce the swing arm using sheet metal parts and by welding or by means of 3D printing. The swing arm can be made of metal, preferably cast steel or cast iron, wherein designs using aluminum, fiber-reinforced plastics (FRP), or similar materials are also conceivable. Preferably, the swing arm can have a lattice or rib structure within the front region, which increases the stability of the swing arm. The third region can be made of solid material. Depending on the application, the second region can be made of solid material or as a hollow body, optionally having a lattice or rib structure. Thus, for example, a weight reduction may be achieved. In one embodiment, the second region can be the same as the third region.

According to an advantageous embodiment, at least one line can extend along the swing arm. These can be supply and/or control lines, in particular for the motor. The lines can be hydraulic lines, for example, or they can be used for energy supply, in particular in an electrical or pneumatic manner, for cooling, for communication, or for other purposes. Multiple lines can extend together or separately along the swing arm or can be connected in the form of a cable harness to form a large line.

In one advantageous embodiment, the line extends in a recess in the swing arm or is attached to the swing arm. The swing arm also preferably has a passage for the line in its third region, through which a connection to the motor can be established.

According to one particularly advantageous embodiment, the line can be designed in the form of one or more channels integrated into the swing arm. This configuration can be provided in the casting mold. Through a clever design, for example in combination with a lattice or rib structure in regions of the swing arm embodied as hollow bodies, the integrated channels can be designed in the form of a heat exchanger for cooling the motor, wherein elements of the heat exchanger can be provided inside and/or outside the swing arm.

According to one advantageous embodiment, the swing arm can comprise an outwardly oriented conical surface in its third region in order to attach the motor. This can in particular be a conical outer surface of a cylinder or a hollow cylinder, onto which the stationary part of the motor can be pushed, pressed on, or otherwise fixed to it.

The swing arm can preferably be mounted on the vehicle by means of two rubber bearings in the first region of the swing arm. The mounting can take place via an auxiliary frame or a subframe. In addition, the mounting of the swing arm can take place via a torsion bar spring.

According to a further preferred embodiment, the wheel suspension can furthermore comprise a first braking device attached to the third region of the swing arm. A second braking device can preferably also be attached to the third region of the swing arm. Furthermore, the swing arm can preferably be supported on the vehicle via a vibration damper.

The underlying object is furthermore achieved by the features of a swing arm mounted pivotably on the vehicle around a pivot axis in a first region, and supported on the vehicle in a second region, wherein a third region of the swing arm carries a part of the motor which is rotationally fixed in relation to the swing arm in order to transmit a torque to the wheel using a rotating part of the motor.

In further embodiments, a wheel suspension for a wheel of a vehicle driven by an electric or pneumatic motor, in particular the rear wheel of a utility vehicle, can have a swing arm that is mounted in a first region on the vehicle and is supported in a second region on the vehicle. A first braking device can be attached to the swing arm in a third region.

By connecting the braking device directly to the swing arm, the first braking device is more easily accessible for maintenance and replacement work. Furthermore, there is no need for a more complicated suspension of brake components, which are connected to a separate wheel carrier element in wheel suspensions according to the prior art. Attaching the braking device directly to the swing arm also saves installation space and simplifies the wheel suspension by eliminating a wheel carrier element.

The first braking device can preferably be a brake caliper of a disc brake. This can be a pneumatic disc brake, as is customary in utility vehicles according to the prior art. The disc brake is preferably embodied as hydraulic or hydropneumatic, but electrical, electromechanical, and electrohydraulic braking devices are also conceivable.

More preferably, the swing arm can have a recess and/or an accumulation of material in order to at least partially enclose a brake disc of the disc brake. This can protect the brake disc, for example from rock impacts or other disruptive influences on a roadway—such as snow and ice, branches and scrub, potholes, and uneven road surfaces. The brake disc is preferably connected in a rotationally-fixed manner to the rotating part of the motor, so that a braking force applied to the brake disc directly transmits a braking torque to the wheel.

According to one embodiment, the third region of the swing arm can also be designed to connect a second braking device to it. The second braking device is preferably not also designed as a brake caliper of a disc brake but can also comprise a different type of braking device.

In particular, the second braking device can be a parking brake device. This can be a parking brake that can also act on the brake disc.

Preferably, the first braking device and the second braking device can respectively be coupled to an upper side and a lower side of the swing arm, or vice versa. For example, the first braking device can be designed as a brake caliper and can be located on the upper side of the swing arm. The second braking device, designed as a parking brake device, can be fastened on the lower side of the swing arm. With such a clever design of the third region of the swing arm, a two-sided "TWO FACE" brake attachment is implemented both above and below on the swing arm.

Furthermore, the first braking device and/or the second braking device can preferably be connected to the third region via an interface and/or via a braking adapter in order to implement a modular system. Different braking devices can be attached to interfaces or brake adapters, for example via through holes or threaded holes. The modular system can in particular be of modular design, that is to say having universal or uniform interfaces for connecting different braking devices for different applications, for example for use in trucks, buses, or other utility vehicles.

In further embodiments, a wheel suspension for a wheel of a vehicle driven by an electric or pneumatic motor, in particular the rear wheel of a utility vehicle, can have a swing arm that is mounted in a first region on the vehicle and is supported in a second region on the vehicle via a vibration damper. The swing arm can in particular have an interface for connecting different types of vibration dampers.

In this way, depending on the application, different types of vibration dampers may be flexibly integrated into the wheel suspension. This can depend in particular on the type of vehicle or utility vehicle. The respective vibration damper can thus be selected to be individually compatible for individual vehicle classes or vehicle types and can be connected uniformly via the interface. By providing a universal interface, the wheel suspension can also be retrofitted for future technologies. The repair and replacement of vibration dampers is also simplified, so that the service life of the wheel suspension lengthens. The complexity and the costs of production also decrease with the variety of parts that have to be designed and stocked for different series.

The vibration damper is preferably connected to the interface directly or via an adapter. In the latter case, the interface can be adapted to attach one of a plurality of different adapters thereon. Since different vibration dampers have different designs for the application, a corresponding adapter can ensure compatibility with the universal interface for each vibration damper. Each of the different adapters can in each case be adapted in order to attach one or more different vibration dampers thereon. While the interface is thus designed in the same way in every case, the adapter is designed for one type of vibration damper in each case. The vibration damper can therefore be adapted to the respective vehicle architecture in order to achieve variability and flexibility in the vehicle construction.

The interface can include cutouts and/or accumulations of material that align the adapter and/or transmit forces. In this way, the correct application is ensured for every type of adapter. In addition, assembly is simplified.

The interface can in particular be designed as an end face of the swing arm facing away from the first region. Since the pivot axis of single-link suspensions is usually arranged at the front in the direction of travel, the end face generally faces to the rear, wherein the reverse case is also possible. With the distances between the pivot axis of the swing arm, the wheel carrier axis, and the vibration damper, advantageous constructions for absorbing the driving forces may be found through the respectively implemented lever arms. Here, the adapter can be used to position the point of engagement of the vibration damper closer to the pivot axis or further away from it. The interface can comprise further bores for fastening elements, in particular for screws. For example, the end face can generally have the shape of a rounded square and comprise four bores. Each of the bores can preferably be provided with a thread. Fastening using other detachable fastening means or using rivets is also possible.

Interface and/or adapter are therefore preferably designed in order to implement a modular system. This can be done, for example, through internal or cross-company standardization or standardization of the dimensions of corresponding components, in particular the adapter and the vibration damper.

The vibration damper is also preferably a pneumatic spring-damper device. This can be achieved in particular by an air suspension. By adjusting the bellows pressure of the air suspension, the vehicle height can be kept constant or it can be adjusted in a controlled manner for loading and unloading transport goods or for getting passengers on and off. The ability to absorb vibrations remains almost the same over a wide setting and control range.

Here, the adapter can in particular be designed as an extension of the swing arm and can taper in the direction away from the swing arm, and at its end can have a substantially horizontal surface to which a mechanical air spring element and preferably a damper element of the pneumatic spring-damper device are coupled. It is thus possible to accommodate the spring element and the damper element as a single component.

However, the rigidity of air suspensions can only be variably adjusted within a very small setting range. Thus, when using pneumatic spring-damper devices, it is necessary to install different components for different installation space conditions and road surface qualities, which increases the variety of parts and the costs. Other vibration dampers are therefore also advantageous for a modular system.

The vibration damper can in particular be a hydraulic, hydropneumatic, electrical, electromechanical, or electrohydraulic spring-damper device. In this case, the adapter is preferably designed in the form of a plate which, at a lower end, can have a bearing fork designed in the form of two elevations for the spring-damper device.

Since spring-damper devices have only one degree of freedom—namely to allow movements of their two connection points towards and away from each other through contraction and expansion—spring-damper devices are usually articulated at their ends, since an angle of the longitudinal axis of the spring damper device has to be changeable both relative to the swing arm and also relative to the vehicle during compression. Such an articulated mounting can be implemented between the two elevations of the mounting fork.

The swing arm can preferably be mounted on the vehicle by means of two rubber bearings in the first region of the swing arm, which are mounted on the body directly or via an auxiliary frame, preferably via a torsion bar spring. Here, the spring damper device can interact with the torsion bar spring. In one embodiment, the vibration damper can only be a damper, wherein the spring function is fulfilled solely by the torsion bar spring.

In a preferred refinement, a vehicle can preferably have a corresponding second axle, in particular a steerable front axle, which is sprung in the same way, for example also with a pneumatic, hydraulic, hydropneumatic, electrical, electromechanical, or electrohydraulic spring-damper device.

With the modular system, diverse combinations of all available technologies from the areas of pneumatics, hydraulics, and electrics can be implemented, particularly close to customer requirements. For example, it is conceivable to attach a vibration damper to the third region or to the brake adapter for some special applications.

Figure 3:
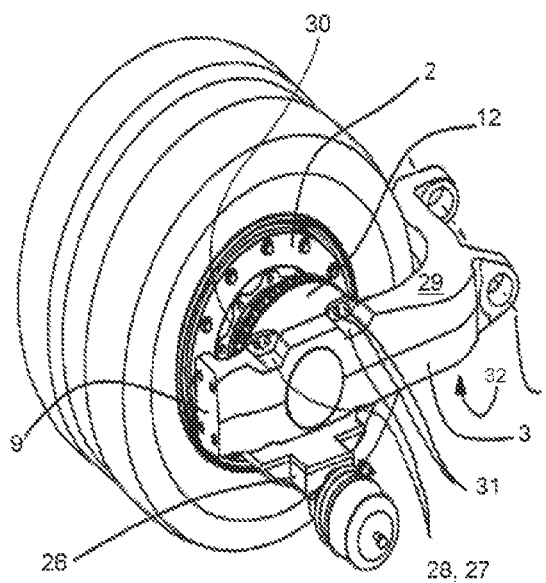
Figure 4:
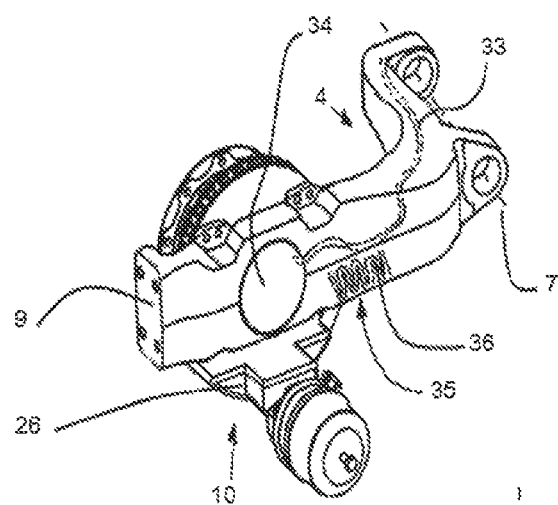
Figure 5:
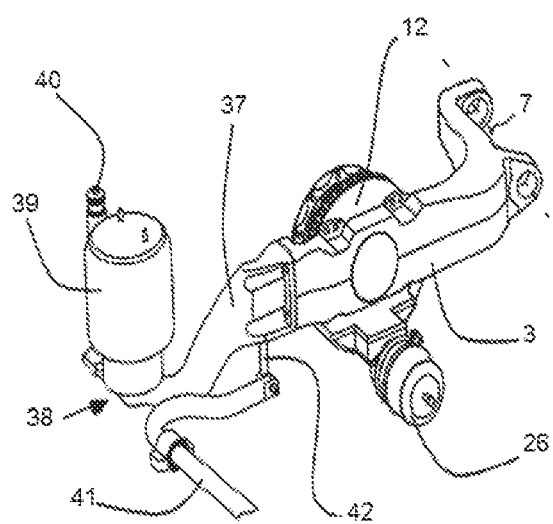
Figure 6:
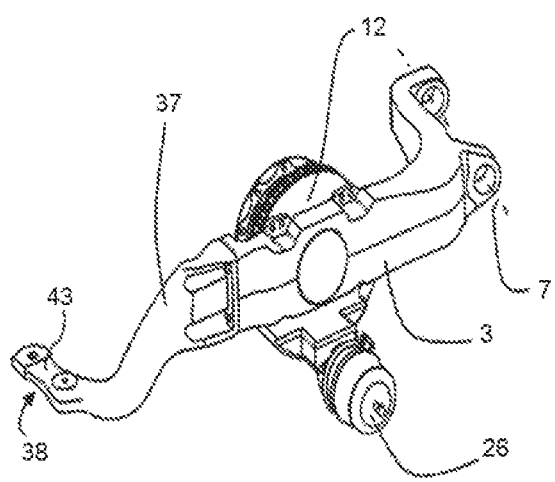
Figure 7:
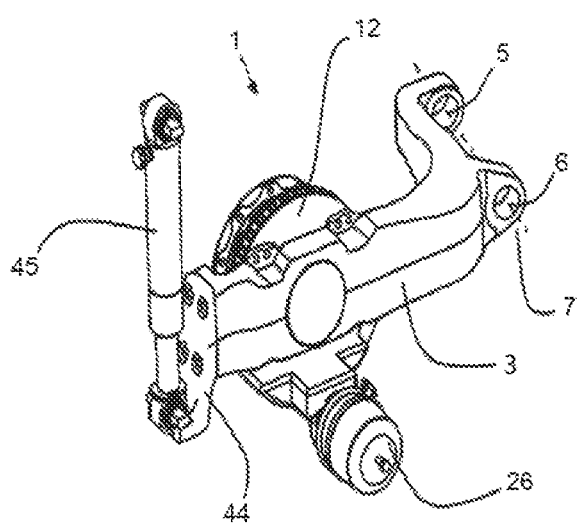
Figure 8:
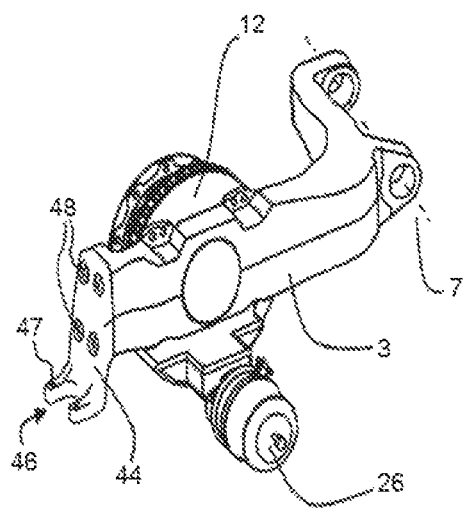

There are various options for advantageously designing and refining the teaching of the present disclosure. For this purpose, reference is made on the one hand to the claims subordinate to claim 1 and on the other hand to the following explanation of preferred exemplary embodiments of the disclosure with reference to the drawing. In conjunction with the explanation of the preferred exemplary embodiments of the disclosure with reference to the drawing, generally preferred designs and refinements of the teaching are also explained. In the figures FIG. 1 shows a perspective view of a wheel suspension according to the disclosure with a motor, FIG. 2 shows a perspective view of a wheel suspension according to the disclosure without a motor, FIG. 3 shows a perspective view of a wheel suspension according to the disclosure with a motor and without a brake caliper, FIG. 4 shows a perspective view of a wheel suspension according to the disclosure without a motor and without a brake caliper, FIG. 5 shows a perspective view of a wheel suspension according to the disclosure with a pneumatic spring-damper device, FIG. 6 shows a perspective view of a wheel suspension according to the disclosure with an adapter for a pneumatic spring-damper device, FIG. 7 shows a perspective view of a wheel suspension according to the disclosure with a hydropneumatic spring-damper device, FIG. 8 shows a perspective view of a wheel suspension according to the disclosure with an adapter for a hydropneumatic spring-damper device, FIG. 1 shows a wheel suspension 1 for a wheel of a vehicle, in particular for the rear wheel of a utility vehicle (not shown). The wheel of the vehicle is driven by an electric motor 2 in the form of a wheel hub drive. A swing arm 3 is also shown. The swing arm 3 has a first region 4. The swing arm 3 is mounted in the first region 4 on the vehicle (not shown in FIG. 1). For this purpose, two through bores 5, 6 are provided in the first region 4, which define a pivot axis 7 of the swing arm 3. A second region 8 of the swing arm 3 is used to support the swing arm 3 on the vehicle. For this purpose, an interface 9 in the form of an outer end face on the second region 8 is formed on the second region 8. Furthermore, a third region 10 can be seen, which carries a rotationally-fixed part of the motor 2. The swing arm 3 is a cast part made of metal, wherein the first region 4 of the swing arm 3 is designed as a hollow body. The second region 8 and the third region 10 of the swing arm 3 are made of solid material. In the embodiment of FIG. 1, the third region 10 is arranged centrally between the first region 4 and the second region 8. Due to the lever action of the swing arm 3, this embodiment results in a lower load on the wheel suspension 1 and is therefore kinematically advantageous. However, the second region 8 could also be arranged between the first region 4 and the third region 10.

The rotationally-fixed part of the motor 2 is in particular supported in a rotationally-fixed manner by the third region 10 of the swing arm 3. For this purpose, the third region 10 comprises an outwardly oriented conical surface (not visible in FIG. 1) onto which the rotationally-fixed part of the motor 2 is pressed. The rotationally-fixed part of the motor 1 can thus interact with a rotating part of the motor 2 in order to transmit a torque to the wheel, wherein the wheel is in turn connected in a rotationally-fixed manner to the rotating part of the motor 2.

A first braking device 11 is furthermore attached to the third region 10 of the swing arm 3. The first braking device 11 is designed in the form of a brake caliper for a disc brake and is fixed to the swing arm 3 via screw connections (not shown in FIG. 1). The brake caliper cooperates with a brake disc 12, which is connected to the rotating part of the motor 2 in a rotationally-fixed manner. In addition, accumulations of material 13 can be seen on the swing arm 3, which at least partially enclose the brake disc 12 and thus protect it from mechanical interfering influences.

In addition, a brake adapter 14 for a second braking device (not shown in FIG. 1) is attached to the third region 10, in particular for a parking brake device in the form of a parking brake. Different types of brake adapter 14 for different types of braking devices can be attached to the swing arm 3.

The interface 9 is used to support the swing arm 3 on the vehicle or to connect different types of vibration dampers (not shown in FIG. 1). The interface 9 is designed as an end face of the swing arm 3 facing away from the first region 10 and comprises bores 15 for fastening elements (not shown in FIG. 1) in order to attach vibration dampers or adapters (not shown in FIG. 1) to the interface 9. A recess 16 is shown as an example on the end face, for example, in order to align the adapter and to transmit forces between the adapter and the interface. In FIG. 1, the recess 16 is designed in the form of a rectangular depression, wherein depending on the application, other appropriate configurations of depressions or material accumulations on the one hand on the interface 9 with corresponding material accumulations or depressions on the adapter are possible.

Referring now to FIG. 2a, the swing arm 3 is designed as a semi-trailing arm swing arm for a semi-trailing arm suspension. Here, the swing arm 3 is arranged with a sweep angle 17 which is in a first angle range between 10° and 25°. The sweep angle 17 is the angle between the pivot axis 7 and a vehicle transverse axis 18 in a horizontal plane 19. Furthermore, the swing arm 3 is arranged with a roof angle 20 which is in a second angle range between 0° and 5°. The roof angle 12 is the angle between the pivot axis 7 and the vehicle transverse axis 18 in a vertical plane 21.

The inclined suspension—that is, the mounting of the swing arm 3 on the vehicle—takes place at the through bores 5, 6 by means of two rubber bearings (not shown) in the first region 4 of the swing arm 3. The rubber bearings are either attached directly to a receptacle on the frame of the vehicle or are mounted on an auxiliary frame to optimize driving comfort. Furthermore, a torsion bar spring can be attached along the pivot axis 7 for further suspension between at least one of the rubber bearings and the frame or auxiliary frame (not shown).

The mode of operation of a semi-trailing arm wheel suspension and the relationship between the sweep angle 17 and roof angle 18 will become even clearer when looking at FIG. 2b. The upper part 22 of FIG. 2b shows a view in the vertical plane 21. The wheel 23 stands on the roadway 24. The swing arm 3 of the semi-trailing arm wheel suspension defines a pivot axis 7 on which an instantaneous center 25 of the wheel 23 lies. The swing arm 3 is tilted by the roof angle 20 in the vertical plane 21.

The lower part 25 of FIG. 2b shows a view in the horizontal plane 19, that is to say from above. The pivot axis 7 is also tilted in the lower part of FIG. 2b, namely in the horizontal plane 19 by the sweep angle 17 with respect to the vehicle transverse axis 18. By increasing the sweep angle 17, the change in camber during compression decreases. Furthermore, the roll center increases, wherein the roll center can be lowered again by changing the roof angle 20. By reducing the sweep angle 17 or increasing the roof angle 20, however, more favorable braking pitch support can be achieved.

FIG. 3 shows the wheel suspension 1 with a pneumatic braking device as the second braking device 26. Since the first braking device 11, which is designed as a brake caliper, is absent in FIG. 3, the brake disc 12, which is connected to the rotating part of the motor 2, can be seen better in FIG. 3 The interface 27 for the first braking device 11 is designed in the form of two recesses 28 on an upper side 29 of the swing arm 3. At the recesses 28 there are two side walls 30 arranged on the wheel side, each with two through bores 31 for fastening means, with which the first braking device—for example a brake caliper—can be attached to the upper side 29 of the swing arm 3 (not shown in FIG. 3). Instead of a brake adapter (not shown in FIG. 3), a second braking device 26, which is designed as a pneumatic braking device, is connected to a lower side 32 of the swing arm 3. However, the reverse case is also conceivable, in which a first braking device in the form of a brake caliper is coupled to the lower side 32 of the swing arm 3 and a second braking device is coupled to the upper side 29 of the swing arm 3, or other embodiments with two braking devices on the upper side 29 and the lower side 32 of the swing arm 3 (not shown in FIG. 3).

In FIG. 4, a line 33 is indicated which extends along the swing arm 3. The line 33 can be fastened to the swing arm 3 or arranged in a recess in the swing arm 3. In the present exemplary embodiment, the line 33 extends through the first region 4 and the third region 10 of the swing arm 3 up to a passage 34. The passage 34 extends through the swing arm 8 and allows the line 33 to be guided into an interior of the wheel hub.

Furthermore, lines can be seen in the swing arm 3 as channels 35 integrated in the swing arm 3 in FIG. 4, which are arranged in the form of a heat exchanger. In this case, ribs 36 of the heat exchanger can be provided inside and/or outside of the swing arm, wherein the ribs in FIG. 4 extend in particular within the swing arm 3. The ribs 36 may in particular be integrated into the first region 4 of the swing arm 3, which can be designed as a hollow body through which ribs 36 pass.

The cooling of the motor (not shown in FIG. 4) can be optimized using such a heat exchanger. Due to the design of the ribs 36 and lines of the heat exchanger as channels 35 integrated into the swing arm 3, the variety of parts can be reduced. Furthermore, the heat transfer can take place within the heat exchanger close to the wheel, without coolant having to be conveyed over long distances and the temperature difference required for the operation of the heat exchanger decreasing as a result.

FIG. 5 shows a wheel suspension 1 in which a vibration damper is connected to the interface 9 via an adapter 37. The vibration damper is designed as a pneumatic spring-damper device. The adapter 37 is designed as an extension of the swing arm 3 and tapers in the direction away from the swing arm toward one end 38. An air spring element 39 and a damper element 40 are fastened to the end 38 of the adapter 37. An additional stabilizer 41 connected to the vehicle damps vibrations of the swing arm 3 and is connected to the adapter 37 by means of a stabilizer link 42.

FIG. 6 shows the assembly from FIG. 5 without an air spring element and a damper element. It can be seen that the end 38 has an essentially horizontal surface 43 to which the spring element and the damper element of the pneumatic spring-damper device 39, 40 can be coupled.

The wheel suspension 1 shown in FIG. 7 has a vibration damper which is connected to the interface 9 via another adapter 44. The swing arm 3 and the interface 9 for connecting the adapter 37, 44 do not have to be changed for this purpose. In this way, both the interface 9 and the adapter 37, 44 are designed in order to implement a modular system. The vibration transducer is a hydropneumatic spring-damper device 45. Using the hydropneumatic spring-damper device 45, rolling movements in curves can be largely eliminated without an additional stabilizer. The rigidity and vibration absorption behavior of the hydropneumatic spring-damper device 45 can be set and regulated over a large range and can thus be kept constant almost independently of the load on the vehicle. To connect the hydropneumatic spring-damper device 45, the adapter 44 is designed in the form of a plate for mounting the hydropneumatic spring-damper device.

In FIG. 8—without hydropneumatic spring-damper device—it can be seen that the adapter 44 designed as a plate has at its lower end a bearing fork 46 designed in the form of two elevations, which are each formed having bearing points for an articulated mounting of the hydropneumatic spring-damper device. The adapter 44 designed as a plate can—like the adapter 37 described above with reference to FIGS. 5 and 6—be attached to the interface 9 via screw connections 48, and in the present exemplary embodiment is attached to the interface 9 via four screw connections 48 arranged in a square.

The exemplary embodiments 37, 44 of the adapter described in conjunction with FIGS. 5 to 8 show how the interface 9 of the swing arm 3 is suitable for connecting different types of vibration dampers 39, 40, 45. The interface 9 of the swing arm 3 is adapted to attach to it one of a plurality of different adapters 37, 44, for example for use with a pneumatic spring-damper device 39, 40, with a hydropneumatic spring-damper device 45, or with electrical, electro-mechanical, or electro-hydraulic spring-damper devices. In this way, a modular system is implemented.

With regard to further advantageous embodiments of the device according to the disclosure, to avoid repetitions, reference is made to the general part of the description and to the appended claims.

Finally, it is to be expressly noted that the above-described exemplary embodiments are used solely to explain the claimed teaching, but do not restrict the disclosure to the exemplary embodiments.

LIST OF REFERENCE SIGNS 1 wheel suspension
2 motor
3 swing arm
4 first region
5 through bore
6 through bore
7 pivot axis
8 second region
9 interface (vibration damper)
10 third region
11 first braking device
12 brake disc
13 accumulations of material
14 brake adapter
15 bores
16 recess (adapter)
17 sweep angle
18 vehicle transverse axis
19 horizontal plane
20 roof angle
21 vertical plane
22 upper part of FIG. 2b
23 wheel
24 roadway
25 lower part of FIG. 2b
26 second braking device
27 interface (first braking device)
28 recess (first braking device)
29 upper side
30 lateral wall
31 through bore
32 lower side
33 line
34 passage
35 integrated channels
36 ribs
37 adapter (pneumatic vibration damper)

38 end
39 air suspension element
40 damper element
41 stabilizer
42 stabilizer link
43 horizontal plane
44 adapter (hydropneumatic vibration damper)
45 hydropneumatic spring-damper device
46 bearing fork
47 bearing point
48 screw connections

The invention claimed is:

1. A wheel suspension for a wheel of a vehicle including a motor, comprising:
a swing arm including a first region, a second region and a third region, the swing arm being mounted pivotably around a pivot axis on the vehicle in the first region and supported on the vehicle in the second region;
wherein part of the motor is carried by the swing arm and rotationally affixed to the swing arm in order to transmit a torque to the wheel,
wherein the first region of the swing arm comprises a hollow body and the third region of the swing arm comprises a solid body, and the swing arm is manufactured using metal.

2. The wheel suspension according to claim 1, wherein the motor comprises a wheel hub drive.

3. The wheel suspension according to claim 1, wherein:
the swing arm comprises a semi-trailing arm swing arm for a semi-trailing arm suspension of the wheel.

4. The wheel suspension according to claim 1, wherein:
the swing arm is arranged at a sweep angle of between 10° and 25°, and is arranged at a roof angle of between 0° and 5°.

5. The wheel suspension according to claim 1, further comprising:
a line extending along the swing arm or in the swing arm.

6. The wheel suspension according to claim 5, wherein:
The line extends in a recess in the swing arm or is attached to the swing arm.

7. The wheel suspension according to claim 5, wherein:
the swing arm further comprises a passage for the line in the third region.

8. The wheel suspension according to claim 5, wherein:
the line comprises one or more channels in the swing arm.

9. The wheel suspension according to claim 8, wherein:
the one or more channels in the swing arm are arranged in the form of a heat exchanger, the heat exchanger including ribs located inside and/or outside the swing arm.

10. The wheel suspension according to claim 1, wherein:
the swing arm further comprises an outwardly directed conical surface on the third region for attaching the motor.

11. The wheel suspension according to claim 1, further comprising:
two rubber bearings in the first region of the swing arm, which are mounted directly or via an auxiliary frame.

12. The wheel suspension according to claim 1, further comprising:
a first braking device attached to the third region of the swing arm and optionally a second braking device attached to the third region of the swing arm.

13. The wheel suspension according to claim 1, further comprising:
a vibration damper supporting the swing arm on the vehicle in the second region.

14. The wheel suspension of claim 13, wherein the vibration damper comprises a spring damper device.

* * * * *